Patented Nov. 11, 1924.

1,514,812

UNITED STATES PATENT OFFICE.

ROBERT H. YOUNGMAN, OF PITTSBURGH, PENNSYLVANIA, ASSIGNOR TO HARBISON-WALKER REFRACTORIES COMPANY, OF PITTSBURGH, PENNSYLVANIA, A CORPORATION OF PENNSYLVANIA.

NEUTRAL CEMENT.

No Drawing. Application filed August 26, 1921. Serial No. 495,759.

*To all whom it may concern:*

Be it known that I, ROBERT H. YOUNGMAN, a citizen of the United States, and a resident of Pittsburgh, in the county of Allegheny and State of Pennsylvania, have invented a new and useful Improvement in Neutral Cement, of which the following is a specification.

This invention relates to refractory cements. More particularly it relates to certain mixtures of dry materials, capable of forming a mortar or cement upon the addition of water, suitable for use in building walls and structures exposed to intense heat, molten metals, slag, etc.

A particular object of the invention is to provide a composition which may be formed by mixing together dry powdered materials, and which can be shipped in the dry state to the point of use, there to be formed into a mortar or cement of the desired consistency simply by the addition of water.

Another object is to provide such a dry material in a form and of a composition which will prevent the solids from separating from the liquid when mixed into a mortar.

Another object is to produce a mortar of uniform consistency and a high degree of plasticity. Other objects and advantages will be found in the use of the material.

Heretofore it has been customary to lay walls of fire clay and silica brick in furnace constructions with a mortar of fire clay. This is less resistant to heat and slag than the bricks themselves, and therefore the mortar is eaten out by the molten slag, or metal, and tends to fail before the bricks themselves have been injured.

I have found that a good mortar for such use may be made by intimately mixing powdered chrome ore with dry powdered sodium silicate and adding a suitable amount of water.

This material has the great advantage that the dry mixture of chrome and sodium silicate may be made in a central plant and shipped to any desired place, the water being added there. Thus, freight cost is reduced, and a mortar of proper consistency is easily made up by unskilled workmen.

The chrome ore is ground very fine by any suitable machinery. With this powdered ore there is then mixed about 7½% of dry sodium silicate in the form of a fine powder. The two are commingled until there is an intimate and uniform mixture throughout.

When a refractory cement is to be made up, the dry composition above described is diluted with about 18% of water and properly stirred until the desired consistency is obtained. It is then used as ordinary mortar for building up walls of refractory brick, or for any other uses to which a refractory cement is adapted.

The mortar being of a neutral composition is not readily attacked by slags or metals, and will outlast the ordinary fire brick. Its shrinkage is comparatively low, so that it does not tend to fall out or wear away between the bricks. The material sets in a few hours, adheres readily to the brick, and has great strength even before the application of any heat. It retains this strength at a very high temperature, approximately its melting point, which is higher than that of commercial fire clay brick and silica brick. Consequently, the cement will not become soft and rub out between the joints of such brick work at even the highest operating temperatures. There is no chemical reaction between it and the usual refractory material, such as silica brick, fire clay brick, bauxite brick, or basic brick such as magnesite or chrome brick. The mixture, therefore, has a wide range of usefulness.

When the mortar is made simply of chrome ore by itself and sodium silicate, powdered and mingled, it has been found that it is somewhat difficult to make the motar up in the proper plasticity. The chrome ore has a high specific gravity, and the coarse particles of chrome tend to settle to the bottom when a thin mortar is being made. This difficulty may be overcome by the addition of a small amount of dextrine, or other dry organic binders, say ½ to 5%. Dextrine may be used in the form of a dry powder thoroughly mixed, with the chrome and sodium silicate, and may be added in the proper portion at the plant where the dry mixture is made. When water is added the dextrine dissolves and forms a kind of matrix which tends to maintain the plasticity and uniform distribution of the other material. It keeps all the material in suspension as it were. It has another advantage in that the water from a mortar in which dextrine has been used does not soak out of the mortar into the brick as rapidly as where the dextrine is not used. This has a distinct advantage in securing proper setting and binding.

Instead of dextrine as a binder, I may use about 5% or more of bauxite, diaspore or clay.

Bauxite is a form of aluminum clay, which may be ground and mixed in with the sodium silicate and chrome, as above described. It adds considerable to the plasticity of the mixture, and being of neutral chemical composition, it does not have any injurious effect on the properties of the cement.

Diaspore is also a hydrated aluminum oxide, very similar chemically to bauxite, except that it is crystalline, hard, and dense. When ground very fine and made into a mortar it is quite plastic, and adds the element of plasticity to the mixture of chrome and sodium silicate. It has very little shrinkage and is strongly resistant to pressure at high temperatures.

A very good container for shipping the dry compositions above set forth may be made by using a water-proof paper bag, that can be sealed at its mouth after filling with some such material as liquid sodium silicate. This bag before filling is placed inside of a burlap bag, which latter is slightly smaller than the paper bag, so that after filling all of the tensile strain will be carried by the burlap bag. When the paper bag is filled and sealed, with the burlap bag over it, this container can be shipped safely, and has been found to keep the material free from atmospheric deterioration, for any normal period of storage before use.

By making up dry powdered mixtures of the elements above referred to, it is possible to secure uniformity of mixture and exactly the right proportions of the several elements. Nothing is left for the workman to do except to add the proper amount of water. When this is stirred in and mixed, a mortar of the desired plasticity and consistency is produced, which has been found to be entirely satisfactory in use. Obviously, there is a considerable saving of freight and handling cost in the manufacture and shipment of the dry material, with all the moisture eliminated.

There are other advantages which will be apparent to those familiar with the preparation and use of such materials.

I claim:

1. A refractory composition comprising an intimate mixture of powdered chrome ore and powdered sodium silicate.

2. A refractory composition comprising an intimate mixture of powdered chrome ore, powdered sodium silicate, and powdered dextrine.

3. A cement composed of powdered refractory materials, powdered sodium silicate, and powdered dextrine.

4. A refractory composition comprising an intimate mixture of powdered chrome ore, powdered sodium silicate, and a powdered organic binder.

In testimony whereof, I sign my name.

ROBERT H. YOUNGMAN.

Witness:
Edwin O. Johns.